United States Patent

Shiono et al.

[11] Patent Number: 5,854,344
[45] Date of Patent: Dec. 29, 1998

[54] ORGANOPOLYSILOXANE COMPOSITION FOR ELECTRICAL INSULATION

[75] Inventors: Mikio Shiono; Mitsuaki Igarashi, both of Annaka; Hironao Fujiki, Takasaki, all of Japan

[73] Assignee: Shin-Etsu Chemical Co., Ltd., Tokyo, Japan

[21] Appl. No.: 704,866

[22] Filed: Aug. 30, 1996

[30]  Foreign Application Priority Data

Sep. 1, 1995 [JP] Japan ................................ 7-248516

[51] Int. Cl.⁶ ........................ C08L 83/05; C08G 77/08; C08K 3/36
[52] U.S. Cl. ..................... 524/862; 524/588; 524/860; 524/863; 524/865; 524/493; 528/15; 528/31; 528/32; 525/477
[58] Field of Search ................... 524/588, 862, 524/860, 865, 863; 528/15, 31, 32

[56]  References Cited

U.S. PATENT DOCUMENTS

| | | | |
|---|---|---|---|
| 4,888,384 | 12/1989 | Traver | 524/862 |
| 4,978,710 | 12/1990 | Liles | 524/837 |
| 5,237,034 | 8/1993 | Im et al. | 528/26 |
| 5,371,162 | 12/1994 | Konings et al. | 528/31 |
| 5,521,245 | 5/1996 | Hirabayashi et al. | 528/15 |
| 5,599,894 | 2/1997 | Ikeno | 528/32 |
| 5,641,831 | 6/1997 | Hamilton | 524/588 |
| 5,668,225 | 9/1997 | Okazaki et al. | 524/862 |

*Primary Examiner*—Tae Yoon
*Attorney, Agent, or Firm*—Oblon, Spivak, McClelland, Maier & Neustadt, P.C.

[57]  ABSTRACT

There is provided an organopolysiloxane composition for electrical insulation wherein the fluidity is good and an inorganic filler deposited on the bottom of a vessel during the storage can be easily and simply redispersed. The unfoamable organopolysiloxane composition for electrical insulation comprises (A) an organopolysiloxane containing at least two alkenyl groups each bonded to a silicon atom in the molecule, (B) an organohydrogenpolysiloxane containing at least two hydrogen atoms each bonded to a silicon atom in the molecule, (C) an organopolysiloxane containing at least one hydroxyl group bonded to a silicon atom in the molecule, (D) an inorganic filler having an average particle diameter of 1 to 50 μm, and (E) platinum or a platinum compound.

7 Claims, No Drawings

ORGANOPOLYSILOXANE COMPOSITION FOR ELECTRICAL INSULATION

BACKGROUND OF THE INVENTION

1. Field of the Invention

The present invention relates to an essentially unfoamable organopolysiloxane composition for electrical insulation that is excellent in redispersibility of the inorganic filler.

2. Description of the Prior Art

Conventionally, an addition reaction curable liquid organopolysiloxane composition is known of which basic components are an alkenyl-group-containing organopolysiloxane, an organohydrogenpolysiloxane, and a platinum catalyst and which is low in viscosity. The cured product of this composition is excellent, for example, in electrical insulation properties, humidity resistance, water resistance, vibration absorbing properties, thermal shock resistance, and self-extinguishing properties and the casting operation and curing operation of the composition are relatively easy. Therefore, the composition is conventionally used in a large amount as a casting material for electrical and electronic parts, such as high-tension fly-back transformer coils and high-tension rectifier circuits for televisions, coils for motors, and transformer circuits. In the meantime, this casting material is generally required to have good fluidity and good permeability into the applied position. Accordingly, with this casting material are blended a base oil with a low viscosity (the base polymer in the composition) and an inorganic filler, for example, of a silica or alumina having a relatively large particle diameter. However, since this inorganic filler has a specific gravity larger than that of the base oil, it has a defect that it settles and accumulates on the bottom of a vessel during the storage. Further, since the inorganic filler itself is high in hardness, the settled deposit forms hard cake. Moreover, there is also a problem that when the storage lasts long, the hardness of that cake increases to such an extent that the cake has to be crushed mechanically.

Therefore, a method wherein as the inorganic filler a finely divided silica, such as fumed silica, is added to the composition is known, for the purpose of making easy and simple the redispersion of an inorganic filler deposited on the bottom of a vessel during the storage. However, since the composition containing a finely divided silica is increased in viscosity and becomes more thixotropic, the composition has a defect that the fluidity is conspicuously lowered.

SUMMARY OF THE INVENTION

An object of the present invention is to provide an essentially unfoamable organopolysiloxane composition for electrical insulation which is good in fluidity, wherein an inorganic filler deposited on the bottom of a vessel during the storage can be easily and simply redispersed, from which a cured product excellent, for example, in heat dissipation, low thermal expandability, and flame retardancy can be obtained, and of which the cost can be lowered.

The present invention provides an essentially unfoamable organopolysiloxane composition for electrical insulation, comprising (A) an organopolysiloxane represented by the general composition formula (1):

$$(R^1)_a(R^2)_b SiO_{(4-a-b)/2} \qquad (1)$$

wherein $R^1$'s each independently represent an unsubstituted or substituted monovalent hydrocarbon group having no aliphatic unsaturated bond, $R^2$ represents an alkenyl group, a is a number of 1.5 to 2.0, and b is a number of 0.003 to 0.5, provided that a+b ranges from 2.00 to 2.07, having 30 to 600 silicon atoms on the average in the molecule, and containing at least two alkenyl groups each bonded to a silicon atom, (B) an organohydrogenpolysiloxane represented by the general composition formula (2):

$$(R^3)_c H_d SiO_{(4-c-d)/2} \qquad (2)$$

wherein $R^3$'s each independently represent an unsubstituted or substituted monovalent hydrocarbon group having no aliphatic unsaturated bond, c is a number of 1.0 to 2.0, and d is a number of 0.04 to 1.0, provided that c+d ranges from 1.1 to 2.5, having 4 to 120 silicon atoms on the average in the molecule, and containing at least two hydrogen atoms each bonded to a silicon atom; the organohydrogenpolysiloxane (B) being contained in such an amount that the number of the hydrogen atoms each bonded to a silicon atom in the organohydrogenpolysiloxane (B) is 0.5 to 5 per alkenyl group in the organopolysiloxsane (A), (C) an organopolysiloxane represented by the general composition formula (3):

$$(R^4)_e(OH)_f SiO_{(4-e-f)/2} \qquad (3)$$

wherein $R^4$'s each independently represent a hydrogen atom or an unsubstituted or substituted monovalent hydrocarbon group, e is a number of 1.0 to 2.5, and f is a positive number of 1.0 or less, having 2 to 300 silicon atoms on the average in the molecule, and containing at least one hydroxyl group bonded to a silicon atom; the organopolysiloxane (C) being contained in an amount of 0.01 to 15 parts by weight per 100 parts by weight of the sum of the component (A) and the component (B), (D) an inorganic filler having an average particle diameter of 1 to 50 μm in an amount of 30 to 350 parts by weight per 100 parts by weight of the sum of the components (A), (B), and (C), and (E) platinum or a platinum compound in a catalytic amount.

The composition of the present invention is good in fluidity and an inorganic filler deposited on the bottom of a vessel during the storage can be easily and readily redispersed. Further the cured product of the composition of the present invention is not only excellent in heat dissipation and low thermal expandability but also excellent in electrical properties and flame retardancy, and the cost of the composition can be lowered.

DETAILED DESCRIPTION OF THE PREFERRED EMBODIMENT

The present invention is described in detail below.

(A) Organopolysiloxanes containing alkenyl groups

The component (A), an organopolysiloxane containing alkenyl groups, to be used in the composition of the present invention is a base component of that composition and undergoes a hydrosilylation reaction (an addition reaction) with the component (B), an organohydrogenpolysiloxane, in the presence of the catalyst of the component (E) to cure that composition.

The component (A) used in the present invention is represented by the above formula (1) and contains at least two alkenyl groups each bonded to a silicon atom in the molecule. Although its molecular structure may be any of a straight-chain structure, a branched structure, and a cyclic structure, a straight-chain structure or a branched structure is preferable, and a straight-chain diorganopolysiloxane the main chain part of which is composed of diorganosiloxane repeat units and both ends of the molecular chain of which are blocked with a triorganosiloxy unit is most preferable because the synthesis thereof is easy. Further, the viscosity is preferably on the order of 50 to 10,000 cSt, more preferably 100 to 5,000 cSt at 25° C.

The unsubstituted or substituted monovalent hydrocarbon group containing no aliphatic unsaturated bond represented by $R^1$ in the formula (1) includes an unsubstituted or substituted monovalent hydrocarbon group generally having 1 to 12 carbon atoms, particularly 1 to about 8 carbon atoms, for example, an alkyl group, such as a methyl group, an ethyl group, a propyl group, an isopropyl group, a butyl group, an isobutyl group, a tert-butyl group, a hexyl group, an octyl group, a decyl group, and a dodecyl group; a cycloalkyl group, such as a cyclopentyl group, a cyclohexyl group, and a cycloheptyl group; an aryl group, such as a phenyl group, a tolyl group, and a xylyl group; an aralkyl group, such as a benzyl group, a phenylethyl group, and a phenylpropyl group; and corresponding monovalent substituted hydrocarbon groups in which part or all of the hydrogen atoms of the above monovalent hydrocarbon groups have been replaced with a halogen atom(s), such as a fluorine atom(s), a chlorine atom(s) and a bromine atom(s), and/or a nitrile group(s), such as a trifluoropropyl group, a chloromethyl group, a bromoethyl group, and a cyanoethyl group. Further, taking the chemical stability and the synthetic easiness of the obtainable organopolysiloxane into account, preferably $R^1$'s in the formula are selected in such a way that they are all methyl groups, or a methyl group(s) and a phenyl group(s) in combination, or a methyl group(s) and a trifluoropropyl group(s) in combination.

The alkenyl group represented by $R^2$ in the formula (1) includes an alkenyl group having 2 to about 6 carbon atoms, such as a vinyl group, an allyl group, a propenyl group, an isopropenyl group, a butenyl group, an isobutenyl group, and a pentenyl group. Particularly typical ones are a vinyl group and an allyl group with preference given to a vinyl group taking its chemical stability and synthetic easiness into consideration and the alkenyl group may be bonded to either or both of a silicon atom at the end of the molecular chain and a silicon atom in the molecular chain, but preferably the alkenyl group is bonded at least to the end of the molecular chain in view of the curing speed and physical properties, such as mechanical properties, of the cured product.

In the formula (1), a is a number of 1.5 to 2.0, preferably 1.7 to 2.0 and b is a number of 0.003 to 0.5, preferably 0.004 to 0.3, provided that a+b=2.00 to 2.07, preferably 2.00 to 2.03.

The organopolysiloxane of the component (A) has 30 to 600 silicon atoms, preferably about 60 to 300 silicon atoms (or a degree of polymerization), on the average in the molecule and if the number of the silicon atoms in the molecule is too small, the mechanical strength of the cured product of the composition becomes poor while if the number of the silicon atoms in the molecule is too large, the viscosity of the composition becomes high and therefore the fluidity becomes poor. These organopolysiloxanes may be used singly or in a combination of two or more.

Specific examples of such an organopolysiloxane of the component (A) include organopolysiloxanes represented by the following formulas:

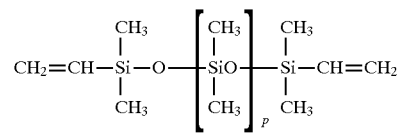

wherein p is an integral number that satisfies p+2=30 to 600,

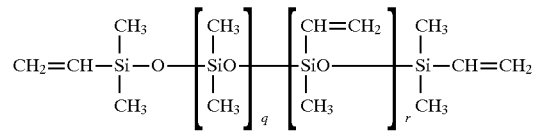

wherein q and r are each an integral number of 1 or more, provided that q+r+2=30 to 600, and

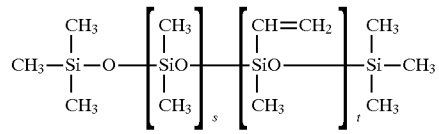

wherein s is an integral number of 1 or more and t is an integral number of 2 or more, provided that s+t+2=30 to 600.

(B) Organohydrogenpolysiloxanes

The organohydrogenpolysiloxane to be used in the present invention acts as a crosslinking agent. This organohydrogenpolysiloxane is represented by the above formula (2) and has at least 2, preferably 3 or more, hydrogen atoms each bonded to a silicon atom (i.e., SiH groups) in the molecule.

Its molecular structure may be any of a straight-chain structure, a branched structure, a cyclic structure, and a three-dimensional network, and the organohydrogenpolysiloxane may be a polymer made up only of siloxane units having a silicon-hydrogen bond [e.g., $HSiO_{3/2}$ units, $R^3(H)SiO_{2/2}$ units, and $(R^3)_2(H)SiO_{1/2}$ units (wherein $R^3$ is the same as $R^3$ in the formula (2), the same being applied hereinafter)] or a copolymer made up of siloxane units having a silicon-hydrogen bond and at least one kind of units selected from triorganosiloxy units [$(R^3)_3SiO_{1/2}$ units], diorganosiloxane units [$(R^3)_2SiO_{2/2}$ units], monoorganosiloxane units ($R^3SiO_{3/2}$ units), and $SiO_{4/2}$ units. Further, the viscosity is preferably of the order of 3 to 120 cSt at 25° C.

The unsubstituted or substituted monovalent hydrocarbon group containing no aliphatic unsaturated bond represented by $R^3$ in the formula (2) includes those exemplifying $R^1$ of the above formula (1). Further, taking the chemical stability and the synthetic easiness of the obtainable organohydrogenpolysiloxane into account, preferably $R^3$'s in the formula are selected in such a way that they are all methyl groups, or a methyl group(s) and a phenyl group(s) in combination, or a methyl group(s) and a trifluoropropyl group(s) in combination.

In the formula (2), c is a number of 1.0 to 2.0 and d is a number of 0.04 to 1.0, provided that c+d is 1.1 to 2.5, preferably 1.9 to 2.3.

The organohydrogenpolysiloxane of the component (B) has 4 to 120, preferably 4 to 100, silicon atoms (or a degree of polymerization) on the average in the molecule and if this number of the silicon atoms in the molecule is too small, it is not preferable because the volatility becomes high whereas if the number of the silicon atoms in the molecule is too large, the fluidity of the composition becomes poor because the viscosity of the composition becomes high. These organohydrogenpolysiloxanes may be used singly or in a combination of two or more.

Specific examples of such an organohydrogenpolysiloxane of the component (B) include a siloxane oligomer, such as 1,3,5,7-tetramethyltetracyclosiloxane and 1,3,5,7,8-pentamethylpentacyclosiloxane; a methylhydrogenpolysiloxane both the ends of the molecular chain of which are blocked with a trimethylsiloxy group, a dimethylsiloxane/methylhydrogensiloxane copolymer both the ends of the molecular chain of which are blocked with a trimethylsiloxy group, a methylhydrogenpolysiloxane both the ends of the molecular chain of which are blocked with a silanol group, a dimethylsiloxane/methylhydrogensiloxane copolymer both the ends of the molecular chain of which are blocked with a silanol group, a dimethylpolysiloxane both the ends of the molecular chain of which are blocked with a dimethylhydrogensiloxy group, a methylhydrogenpolysiloxane both the ends of the molecular chain of which are blocked with a dimethylhydrogensiloxy group, and a dimethylsiloxane/methylhydrogensiloxane copolymer both the ends of the molecular chain of which are blocked with a dimethylhydrogensiloxy group; a silicone resin which comprises $(R^3)_2(H)SiO_{1/2}$ units and $SiO_{4/2}$ units and may optionally contain at least one kind of units selected from $HSiO_{3/2}$ units, $(R^3)_3SiO_{1/2}$ units, $(R^3)_2SiO_{2/2}$ units, $R^3(H)SiO_{2/2}$ units, and $R^3SiO_{3/2}$ units; an organohydrogenpolysiloxane represented by the following formula:

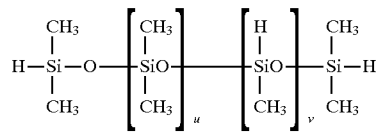

wherein u and v are each 0 or an integral number of 1 or more, provided that u+v+2=4 to 120, and an organohydrogenpolysiloxane represented by the following formula:

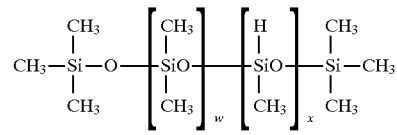

wherein w is 0 or an integral number of 1 or more and x is an integral number of 2 or more, provided that w+x+2=4 to 120.

The amount of the component (B) to be used is such that the number of hydrogen atoms each bonded to a silicon atom (i.e., SiH groups) in the component (B) is 0.5 to 5, preferably 0.8 to 4, per alkenyl group of the component (A) contained in the composition. If this amount to be used is too small, the mechanical strength of the cured product becomes poor whereas if the amount to be used is too large, in addition to the hydrosilylation addition reaction, a dehydrogenation reaction also takes place simultaneously to cause the composition to foam when cured, which makes the mechanical strength of the resulting cured product lowered or makes the physical properties of the resulting cured product liable to change with time.

(C) Organopolysiloxanes containing a silanol group(s)

The organopolysiloxane of the component (C) used in the present invention lowers the settling velocity of the below-mentioned inorganic filler of the component (D) in the composition and also has an effect of improving the redispersibility of the component (D) in the case where it has settled during the storage. This organopolysiloxane is represented by the above formula (3), has 2 to 300 silicon atoms on the average in the molecule, and contains at least 1, preferably 2 or more, hydroxyl groups each bonded to a silicon atom (i.e., silanol groups). Its molecular structure may be any of a straight-chain structure, a branched structure, and a cyclic structure, with preference given to a straight-chain structure because of the easiness of the synthesis, and particularly a diorganopolysiloxane both the ends of the molecular chain of which are blocked with a silanol group is preferred. Further, the viscosity is preferably about 20 to 1,000 cSt, particularly about 100 to 800 cSt, at 25° C. Further, preferably the organopolysiloxane of the component (C) has 20 or more silicon atoms, for example, 20 to 300, particularly 40 to 250, and more particularly about 80 to 250, silicon atoms. If this number of silicon atoms is too small, in some cases the obtainable composition becomes thixotropic and the viscosity of that composition becomes high.

The number of silicon atoms per molecule (or a degree of polymerization) of the silanol group-containing organopolysiloxane of the component (C) is preferably equal to or more than that of the alkenyl group-containing organopolysiloxane of the component (A), in view of the thioxotoropic properties of the resulting composition and the impregnating properties of the composition as a casting material into electric and electronic parts and the like.

In the formula (3), $R^4$ represents a hydrogen atom or an unsubstituted or substituted monovalent hydrocarbon group and the substituted or unsubstituted monovalent hydrocarbon group includes, in addition to the foregoing unsubstituted or substituted monovalent hydrocarbon groups containing no aliphatic unsaturated bond that exemplify $R^1$ of the above formula (1), for example, an alkenyl group having generally 2 to about 6 carbon atoms, such as a vinyl group, an allyl group, a propenyl group, an isopropenyl group, a butenyl group, an isobutenyl group, a pentenyl group, a hexenyl group, and a cyclohexenyl group. Further, taking the chemical stability and the synthetic easiness of the obtainable organopolysiloxane into account, preferably $R^4$'s in the formula are selected in such a way that they are all methyl groups, or a methyl group(s) and a phenyl group(s) in combination, or a methyl group(s) and a trifluoropropyl group(s) in combination. Further, if necessary, a combination containing addition-reactive functional groups, such as a combination of methyl groups with vinyl groups and a combination of methyl groups with hydrogen atoms, may be selected.

Specifically, in the case wherein the component (C) contains addition-reactive functional groups, such as alkenyl groups (e.g., vinyl groups) each bonded to a silicon atom or hydrogen atoms each bonded to a silicon atom (i.e., SiH groups), the component (C) can be effectively prevented from bleeding to the surface of the cured product or the physical strength of the cured product can be effectively prevented from lowering since the component (C) is taken into the crosslinked structure together with the component (A) and the component (B) at the time of curing.

In the formula (3), e is a number of 1.0 to 2.5, preferably 1.5 to 2.2. If e is smaller than 1.0, the synthesis of the organopolysiloxane becomes difficult and the fluidity of the composition becomes poor. If e is greater than 2.5, the required amount of silanol groups cannot be obtained.

In the formula (3), f is a positive number of 1 or less, generally 0.003 to 1, and particularly 0.01 to 0.5, and is selected such that at least one hydroxyl group bonded to a silicon atom (silanol group), and preferably 2 or more hydroxyl groups each bonded to a silicon atom (silanol groups) are present in the molecule. If f is larger than 1, the organopolysiloxane is hard to synthesize and becomes more thixotropic to lower the fluidity of the composition.

The organopolysiloxane of the component (C) has 2 to 300, preferably 40 to 250, and particularly about 80 to 250, silicon atoms (or a degree of polymerization) on the average in the molecule, and if this number of silicon atoms is too small, the obtainable organopolysiloxane becomes unstable to make the handling thereof difficult whereas if this number of silicon atoms is too large, the amount of the organopolysiloxane to be used is increased in order to obtain a desired effect, for example, an improvement in the redispersibility of the inorganic filler of the component (D) and therefore the fluidity of the composition is lowered.

The amount of the component (C) to be used is 0.01 to 15 parts by weight, preferably 0.05 to 12 parts by weight, and more preferably 0.1 to 1 part by weight, per 100 parts by weight of the sum of the above component (A) and the above component (B). If this amount to be used is too small, such an effect as an improvement in the redispersibility of the inorganic filler of the component (D) cannot be obtained. In contrast, if this amount to be used is too large, it acts like a plasticizer and therefore the mechanical strength of the cured product is lowered.

Additionally stated, in the case wherein an organopolysiloxane in which $R^4$ represents an alkenyl group or a hydrogen atom is used, it is required that the amount of the component (B) to be used is adjusted such that the number of hydrogen atoms each bonded to a silicon atom (e.g., the hydrogen atoms each bonded to a silicon atom in the component (B) or the components (B) and (C)) is 0.5 to 5 per alkenyl group bonded to a silicon atom (e.g., the alkenyl group bonded to a silicon atom in the component (A) or the components (A) and (C)) in all the composition.

(D) Inorganic fillers

The inorganic filler to be used in the present invention has an effect not only of lowering the cost of the obtainable composition but also of decreasing the thermal expansion coefficient of the cured product of that composition with improvements in heat dissipation and flame retardancy. The average particle diameter of the inorganic filler to be used in the present invention is 1 to 50 $\mu$m, preferably 2 to 35 $\mu$m, and more preferably 3 to 30 $\mu$m. If this average particle diameter is too small, the fluidity of the composition is lowered. In contrast, if the average particle diameter is too large, the settling velocity of the inorganic filler in the composition is increased and therefore the obtainable cured product becomes heterogeneous and therefore is lowered in mechanical strength. Further, the apparatus used in preparing the composition is worn off severely.

The inorganic filler to be used in the present invention includes, for example, crystalline silica, fused silica, diatomaceous earth, zirconium silicate, alumina, and aluminum hydroxide. Amongst others, taking the attainment of the low cost and the thermal conductivity (heat dissipation) into consideration, crystalline silica, alumina, or a combination of these is preferable.

The amount of the component (D) to be used is 50 to 350 parts by weight, preferably 80 to 300 parts by weight, per 100 parts by weight of the sum of the components (A), (B) and (C) to be used. If that amount to be used is too small, improvements in low expansion coefficient, heat dissipation, and flame retardancy or effects, for example, of lowering the cost of the composition cannot be satisfactorily obtained whereas if that amount is too large, the fluidity of the composition becomes poor and the mechanical strength of the cured product is lowered as well.

(E) Platinum or platinum compounds

The platinum or the platinum compound to be used in the present invention is a catalyst for promoting the hydrosilylation reaction and known such catalysts can be used. Specific examples of the platinum or the platinum compound include platinum black, chloroplatinic acid, an alcohol-modified chloroplatinic acid, a complex of platinum with an olefin, a complex of platinum with an aldehyde, a complex of platinum with a vinylsiloxane, and a complex of platinum with an acetylene alcohol.

The amount of the platinum or the platinum compound to be used is a so-called catalytic amount, can be adjusted suitably in accordance with the desired curing speed of the composition, and is generally of the order of 0.5 to 500 ppm, preferably 1 to 300 ppm, in terms of the weight of platinum atoms, based on the weight of the component (A). If this amount to be used is too small, in some cases, the curing of the composition is unsatisfactory. In contrast, if this amount to be used is too large, since the hydrosilylation reaction proceeds quickly, the pot life is shortened and it is also uneconomical.

Other components

To the composition of the present invention, in addition to the components (A) to (E), if necessary, can be added, for example, a reinforcing filler, a pigment, a heat resistance improver, a flame retardancy improver, a reaction controlling agent, and a plasticizer in the range that will not damage the purpose of the invention.

The above reinforcing filler includes, for example, a resinous organopolysiloxane copolymer essentially comprising $(R^5)_3SiO_{1/2}$ units (wherein $R^5$ is the same monovalent hydrocarbon group defined above for $R^1$, the same being applied hereinafter), $CH_2=CH(R^5)_2SiO_{1/2}$ units, and $SiO_{4/2}$ units wherein the molar ratio of the sum of the $(R^5)_3SiO_{1/2}$ units and the $(CH_2=CH)(R^5)_2SiO_{1/2}$ units to the $SiO_{4/2}$ units is from 0.5 to 1 and 2.5 to 10 mol % of all the silicon atoms have vinyl groups.

The above pigment includes, for example, iron oxide, carbon black, titanium oxide, and zinc oxide.

The above heat resistance improver includes, for example, iron oxide, zirconium silicate, titanium oxide, cerium oxide, cerium hydroxide, and carbon black.

The above flame retardancy improver includes, for example, fumed titanium oxide, cerium oxide, cerium hydroxide, zinc carbonate, manganese carbonate, carbon black, and bezotriazole.

The above reaction controlling agent includes, for example, vinylsiloxanes, acetylene alcohols, silanes or siloxanes containing an ethynyl group(s), and triallyl isocyanurates.

The above plasticizer includes, for example, inert dimethylpolysiloxanes.

In the case wherein the composition of the present invention is to be rendered adhesive, an adhesive aid may be added to that composition.

The above components other than the components (A) to the components (E) (hereinafter referred to as desired components) may be used singly or in a combination of two or more. Parenthetically, in adding the above desired component to the composition, in the case wherein a component containing alkenyl groups each bonded to a silicon atom or hydrogen atoms each bonded to a silicon atom, such as a vinyl-group-containing silicone resin (e.g., the above copolymer having $(R^5)_3SiO_{1/2}$ units, $(CH_2=CH)(R^5)_2SiO_{1/2}$ units, and $SiO_{4/2}$ units), a vinylsiloxane, and an adhesion aid containing hydrogen atoms each bonded to a silicon atom, is added to the composition, it is required that the above desired component is added in such an amount that the number of hydrogen atoms each directly bonded to a silicon atom is 0.5 to 5 per alkenyl group bonded to a silicon atom in the composition after the addition.

Organopolysiloxane compositions for electrical insulation

The composition of the present invention can be obtained easily by mixing homogeneously the above components. In mixing the components, since the above component (A) and the above component (B) undergo a hydrosilylation reaction in the presence of the above component (E), when these components coexist, the curing of the composition starts. Therefore, preferably these components are stored by separating them into at least two packages. A specific example of the method of storing them includes, for example, a method wherein part of the component (A), part of the component (C), part of the component (D), and all the component (E) to be blended are made into one package and the remaining part of the component (A), the remaining part of the component (C), the remaining part of the component (D), and all the component (B) are made into another package. If this method is used, preferably the component (D) is dispensed into the packages so that the specific gravities of the compositions in the two packages may be equal to each other. An another mode of the storing method includes, for example, a method wherein part of the component (A), all the component (C), all the component (D), and all the component (E) to be blended are made into one package, and the remaining part of the component (A) and all the component (B) are made into another package. Then it is suitable that prescribed amounts of these components dispensed into two packages are mixed in a suitable manner when used. Parenthetically, the composition of the present invention can be stored as a single package by blending either acetylene alcohols or triallyl isocyanurates as a reaction controller.

As the usage of the composition of the present invention, generally, that composition is cast directly into a container accommodating electrical/electronic parts or electrical/electronic parts are immersed in that composition to be filled therewith, followed by curing. Parenthetically, although the curing of that composition can proceed even at room temperature, the curing can be promoted by heating. The heating temperature may be of the order of 100° C. or may be selected to be a suitable temperature of 100° C. or over.

EXAMPLES

The present invention will be described below in more specifically with reference to Examples and Comparative Examples, but the present invention is not limited to the following Examples. In the Examples, the parts represent parts by weight and the value of the viscosity is the value measured at 25° C.

Example 1

460 parts of a dimethylpolysiloxane represented by the following formula:

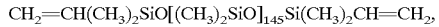
$CH_2=CH(CH_3)_2SiO[(CH_3)_2SiO]_{145}Si(CH_3)_2CH=CH_2$, and having a viscosity of 400 cSt both the ends of the molecular chain of which were terminated by a vinyl group, 35 parts of a methylhydrogenpolysiloxane represented by the following formula:

$(CH_3)_3SiO[(CH_3)HSiO]_7[(CH_3)_2SiO]_8Si(CH_3)_3$, 2.5 parts of a dimethylpolysiloxane represented by the following formula:

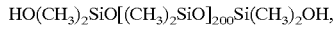
$HO(CH_3)_2SiO[(CH_3)_2SiO]_{200}Si(CH_3)_2OH$, and having a viscosity of 700 cSt both the ends of the molecular chain of which were terminated by a silanol group, 1,000 parts of crystalline silica powder having an average particle diameter of 30 μm, and 2.0 parts of 1,3,5,7-tetramethyl-1,3,5,7-tetravinylcyclotetrasiloxane were charged into a vessel equipped with a vacuum pump and an agitator and were mixed under reduced pressure. The obtained mixture will hereinafter be referred to as Mixture A. Then 1,000 parts of Mixture A were loaded into a metallic round can having a volume of 1 L, was allowed to stand for 3 months, and then was stirred with a metallic spatula, and the relative difficulty of the redispersibility of the resulting settlings was evaluated based on the following criteria. The results are shown in Table 1.

Easy: stirring was effected easily with the spatula.

Difficult: the sediment could be crushed and redispersed with the spatula, but it took a long time to do so.

Very difficult: the sediment was hard and hence could not be redispersed with the spatula.

Next, to 299.9 parts of Mixture A was added 0.1 part of a solution of chloroplatinic acid modified with 2-ethyl hexanol (containing 2% by weight of platinum) and they were stirred to prepare Composition A. The initial viscosity and the specific gravity of Composition A are shown in Table 2. Then, Composition A was cured by heating at 100° C. for 30 min and the following physical properties of this cured product were evaluated. Incidentally, no foaming was observed at all during the curing. The results are shown in Table 2.

(Hardness)

The hardness was measured in accordance with JIS K 6301. In passing, as the testing machine, a spring-loaded hardness tester A type was used.

(Specific volume resistance)

The specific volume resistance was measured in accordance with the method stipulated in JIS C 2123 (the method of testing electrical silicone compounds).

(Breakdown strength)

The breakdown strength was measured in accordance with the method stipulated in JIS C 2123 (the method of testing electrical silicone compounds).

(Dielectric constant [1 MHz])

The dielectric constant was measured in accordance with the method stipulated in JIS C 2123 (the method of testing electrical silicone compounds).

(Dielectric loss tangent [1 MHz])

The dielectric loss tangent was measured in accordance with the method stipulated in JIS C 2123 (the method of testing electrical silicone compounds).

(Flame retardancy)

The flame retardancy was measured in accordance with the method stipulated in UL 94.

Comparative Example 1

The preparation of Mixture A of Example 1 was repeated, except that 2.5 parts of the dimethylpolysiloxane both the ends of the molecular chain of which were terminated by a silanol group were not used, thereby preparing Mixture B. Then 1,000 parts of Mixture B were loaded into a metallic round can having a volume of 1 L, and in the same way as in Example 1, the relative difficulty of the redispersion of the settlings was evaluated. The results are shown in Table 1.

Example 2

455 parts of a dimethylpolysiloxane represented by the following formula:

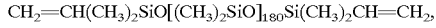
$CH_2=CH(CH_3)_2SiO[(CH_3)_2SiO]_{180}Si(CH_3)_2CH=CH_2$, and having a viscosity of 600 cSt both the ends of the molecular chain of which were terminated by a vinyl group, 40 parts of a methylhydrogenpolysiloxane represented by the following formula:

1.5 parts of a dimethylpolysiloxane represented by the following formula:

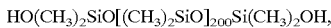

and having a viscosity of 700 cSt both the ends of the molecular chain of which were terminated by a silanol group, 750 parts of crystalline silica powder having an average particle diameter of 5 μm, and 3.0 parts of 1,3,5,7-tetramethyl-1,3,5,7-tetravinylcyclotetrasiloxane were charged into a vessel equipped with a vacuum pump and an agitator and were mixed under reduced pressure. The obtained mixture will hereinafter be referred to as Mixture C. Then 1,000 parts of Mixture C were loaded into a metallic round can having a volume of 1 L, and in the same way as in Example 1, the relative difficulty of the redispersion of the settlings was evaluated. The results are shown in Table 1.

Further the preparation of Composition A of Example 1 was repeated, except that, in place of 299.9 parts of Mixture A, 249.9 parts of Mixture C was used, thereby preparing Composition C. The initial viscosity and the specific gravity of Composition C are shown in Table 2. Then, in the same way as in Example 1, Composition C was cured and the physical properties of this cured product were evaluated in the same way as in Example 1. The results are shown in Table 2. Incidentally, no foaming was observed at all during the curing.

Comparative Example 2

The preparation of Mixture C of Example 2 was repeated, except that 1.5 parts of the dimethylpolysiloxane both the ends of the molecular chain of which were terminated by a silanol group were not used, thereby preparing Mixture D. Then 1,000 parts of Mixture D were loaded into a metallic round can having a volume of 1 L, and in the same way as in Example 2, the relative difficulty of the redispersion of the settlings was evaluated. The results are shown in Table 1.

Example 3

360 parts of a dimethylpolysiloxane represented by the following formula:

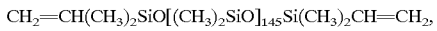

and having a viscosity of 400 cSt both the ends of the molecular chain of which were terminated by a vinyl group, 90 parts of a dimethylpolysiloxane represented by the following formula:

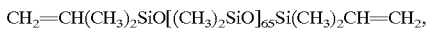

and having a viscosity of 100 cSt both the ends of the molecular chain of which were terminated by a vinyl group, 45 parts of a methylhydrogenpolysiloxane represented by the following formula:

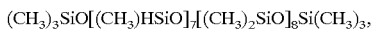

2.0 parts of a dimethylpolysiloxane represented by the following formula:

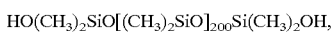

and having a viscosity of 700 cSt both the ends of the molecular chain of which were terminated by a silanol group, 500 parts of crystalline silica powder having an average particle diameter of 5 μm, 450 parts of α-alumina powder having an average particle diameter of 160 μm, and 2.5 parts of 1,3,5,7-tetramethyl-1,3,5,7-tetravinylcyclotetrasiloxane were charged into a vessel equipped with a vacuum pump and an agitator and were mixed under reduced pressure. The obtained mixture will hereinafter be referred to as Mixture E. Then 1,000 parts of Mixture E were loaded into a metallic round can having a volume of 1 L, and in the same manner as in Example 1, the relative difficulty of the redispersion of the settlings was evaluated. The results are shown in Table 1.

Further the preparation of Composition A of Example 1 was repeated, except that, in place of 299.9 parts of Mixture A, 289.9 parts of Mixture E was used, thereby preparing Composition E. The initial viscosity and the specific gravity of Composition E are shown in Table 2. Then, in the same way as in Example 1, Composition E was cured and the physical properties of this cured product were evaluated in the same way as in Example 1. The results are shown in Table 2. Incidentally, no foaming was observed at all during the curing.

Comparative Example 3

The preparation of Mixture E of Example 3 was repeated, except that 2.0 parts of the dimethylpolysiloxane both the ends of the molecular chain of which were terminated by a silanol group were not used, thereby preparing Mixture F. Then 1,000 parts of Mixture F were loaded into a metallic round can having a volume of 1 L, and in the same way as in Example 3, the relative difficulty of the redispersion of the settlings was evaluated. The results are shown in Table 1.

TABLE 1

|  |  | Relative difficulty of redispersion |
|---|---|---|
| Example 1 | Mixture A | Easy |
| Comparative Example 1 | Mixture B | Difficult |
| Example 2 | Mixture C | Easy |
| Comparative Example 2 | Mixture D | Very difficult |
| Example 3 | Mixture E | Easy |
| Comparative Example 3 | Mixture F | Very difficult |

TABLE 2

| Physical properties (unit) | Composition A | Composition C | Composition E |
|---|---|---|---|
| initial viscosity (P) | 60 | 50 | 45 |
| Specific gravity (−) | 1.69 | 1.51 | 1.76 |
| Hardness (scale) | 71 | 69 | 75 |
| Specific volume resistance (Ω.cm) | $9 \times 10^{13}$ | $2 \times 10^{14}$ | $3 \times 10^{14}$ |
| Breakdown strength (kV/mm) | 25 | 27 | 24 |
| Dielectric constant (−) | 3.1 | 3.3 | 3.2 |
| Dielectric constant tangent (−) | $5 \times 10^{-4}$ | $1 \times 10^{-4}$ | $2 \times 10^{-4}$ |
| Flame retardancy (−) | V-0 | V-0 | V-0 |

In Table 2, V–0 indicates the flame retardancy level in the measuring method stipulated in UL 94.

What is claimed is:

1. An essentially unfoamable fluid organopolysiloxane composition for electrical insulation, consisting essentially of a homogeneous mixture of (A) a fluid organopolysiloxane represented by the general formula (1):

$$(R^1)_a(R^2)_b SiO_{(4-a-b)/2} \quad (1)$$

wherein $R^1$'s each independently represent an unsubstituted or substituted monovalent hydrocarbon group having no aliphatic unsaturated bond, $R^2$ represents an alkenyl group, a is a number of 1.5 to 2.0, and b is a number of 0.003 to 0.5, provided that a+b=2.00 to 2.07, having 30 to 600 silicon atoms on the average in the molecule, and containing at least two alkenyl groups each bonded to a silicon atom, (B) a fluid organohydrogenpolysiloxane represented by the general formula (2):

$$(R^3)_c H_d SiO_{(4-c-d)/2} \quad (2)$$

wherein $R^3$'s each independently represent an unsubstituted or substituted monovalent hydrocarbon group having no aliphatic unsaturated bond, c is a number of 1.0 to 2.0, and d is a number of 0.04 to 1.0, provided that c+d=1.1 to 2.5, having 4 to 120 silicon atoms on the average in the molecule, and containing at least two hydrogen atoms each bonded to a silicon atom; the organohydrogenpolysiloxane (B) being contained in such an amount that the number of the hydrogen atoms each bonded to a silicon atom contained in the organohydrogenpolysiloxane (B) is 0.5 to 5 per alkenyl group in the organopolysiloxane (A), (C) a fluid organopolysiloxane represented by the general formula (3):

$$(R^4)_e(OH)_f SiO_{(4-e-f)/2} \quad (3)$$

wherein $R^4$'s each independently represent a hydrogen atom or an unsubstituted or substituted monovalent hydrocarbon group, e is a number of 1.0 to 2.5, and f is a positive number of 1.0 or less, having 2 to 300 silicon atoms on the average in the molecule, and containing at least one hydroxyl group bonded to a silicon atom; the organopolysiloxane (C) being contained in an amount of 0.01 to 15 parts by weight per 100 parts by weight of the sum of the component (A) and the component (B), (D) an inorganic filler having an average particle diameter of 1 to 50 μm in an amount of 30 to 350 parts by weight per 100 parts by weight of the sum of the components (A), (B), and (C), and (E) platinum or a platinum compound in a catalytic amount, wherein the substituents of said substituted monovalent hydrocarbon are halogen or nitrile.

2. The composition of claim 1, wherein the number of silicon atoms of the organopolysiloxane of said component (C) is 20 or more.

3. The composition of claim 1, wherein said $R^4$ are all methyl groups, or at least one methyl group and at least one phenyl group in combination, or at least one methyl group and at least one trifluoropropyl group in combination.

4. The composition of claim 1, wherein said f is a positive number of 0.003 to 1.

5. The composition of claim 1, wherein said f is a positive number of 0.01 to 0.5.

6. A cured product of the composition of claim 1.

7. An essentially unfoamable fluid organopolysiloxane composition for electrical insulation, consisting essentially of a homogeneous mixture of (A) a fluid organopolysiloxane represented by the general formula (1):

$$(R^1)_a(R^2)_b SiO_{(4-a-b)/2} \quad (1)$$

wherein $R^1$'s each independently represent an unsubstituted or substituted monovalent hydrocarbon group having no aliphatic unsaturated bond, $R^2$ represents an alkenyl group, a is a number of 1.5 to 2.0, and b is a number of 0.003 to 0.5, provided that a+b=2.00 to 2.07, having 30 to 600 silicon atoms on the average in the molecule, and containing at least two alkenyl groups each bonded to a silicon atom, (B) a fluid organohydrogenpolysiloxane represented by the general formula (2):

$$(R^3)_c H_d SiO_{(4-c-d)/2} \quad (2)$$

wherein $R^3$'s each independently represent an unsubstituted or substituted monovalent hydrocarbon group having no aliphatic unsaturated bond, c is a number of 1.0 to 2.0, and d is a number of 0.04 to 1.0, provided that c+d=1.1 to 2.5, having 4 to 120 silicon atoms on the average in the molecule, and containing at least two hydrogen atoms each bonded to a silicon atom; the organohydrogenpolysiloxane (B) being contained in such an amount that the number of the hydrogen atoms each bonded to a silicon atom contained in the organohydrogenpolysiloxane (B) is 0.5 to 5 per alkenyl group in the organopolysiloxane (A), (C) a fluid organopolysiloxane represented by the general formula (3):

$$(R^4)_e(OH)_f SiO_{(4-e-f)/2} \quad (3)$$

wherein $R^4$'s each independently represent a hydrogen atom or an unsubstituted or substituted monovalent hydrocarbon group, e is a number of 1.0 to 2.5, and f is a positive number of 1.0 or less, having 2 to 300 silicon atoms on the average in the molecule, and containing at least one hydroxyl group bonded to a silicon atom; the organopolysiloxane (C) being contained in an amount of 0.01 to 15 parts by weight per 100 parts by weight of the sum of the component (A) and the component (B), (D) an inorganic filler having an average particle diameter of 1 to 50 μm in an amount of 30 to 350 parts by weight per 100 parts by weight of the sum of the components (A), (B), and (C), (E) platinum or a platinum compound in a catalytic amount, and (F) a member selected from the group consisting of a reinforcing filler, a pigment, a heat resistance improver, a flame retardancy improver, a reaction controlling agent, and a plasticizer, wherein the substituents of said substituted monovalent hydrocarbon are halogen or nitrile.

* * * * *